April 20, 1943.　　　C. R. STOUGH　　　2,317,311
VEHICLE WHEEL
Filed Dec. 12, 1941　　　2 Sheets-Sheet 1
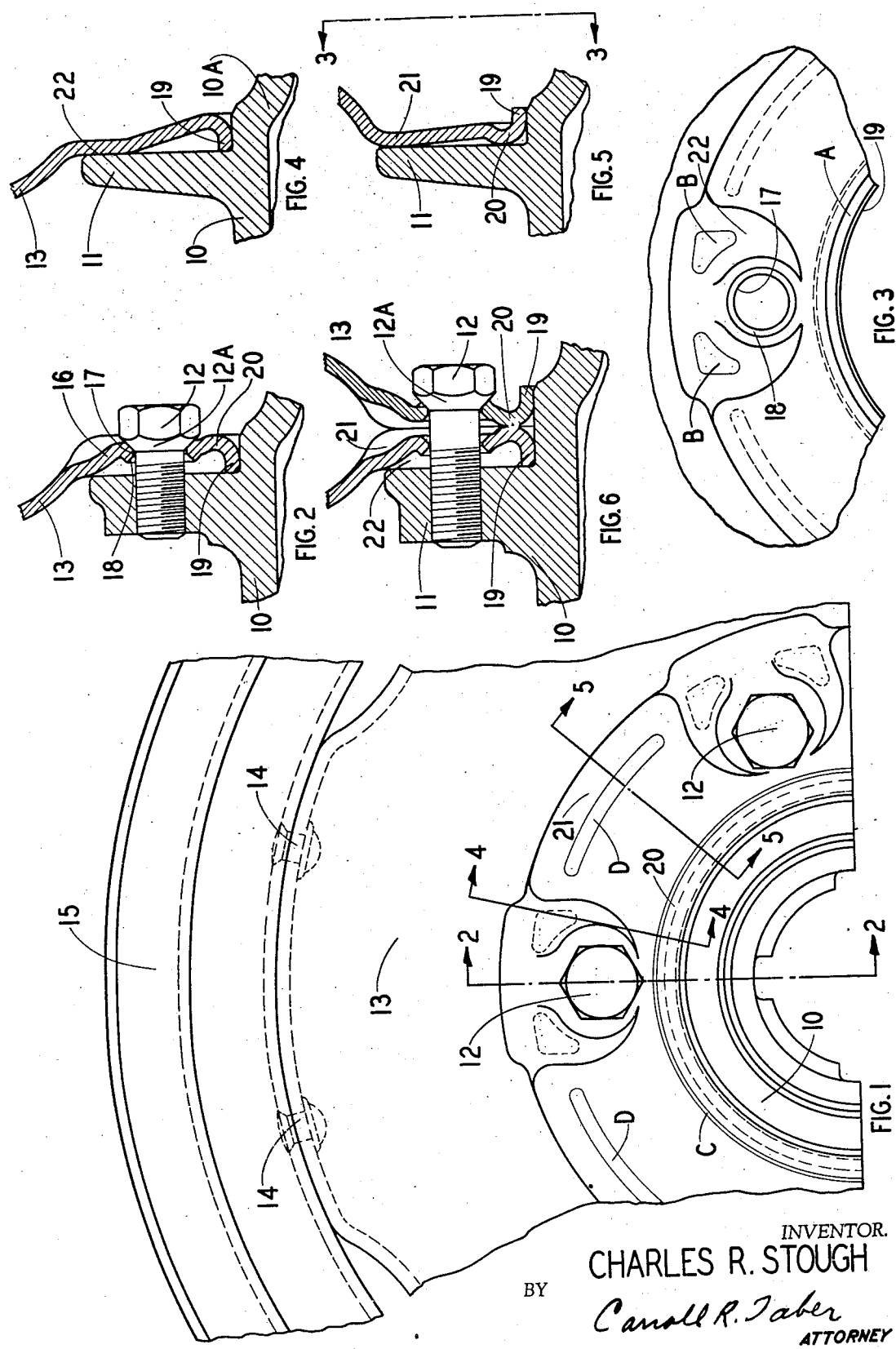
INVENTOR.
CHARLES R. STOUGH
BY Carroll R. Taber
ATTORNEY April 20, 1943.  C. R. STOUGH  2,317,311
VEHICLE WHEEL
Filed Dec. 12, 1941  2 Sheets-Sheet 2
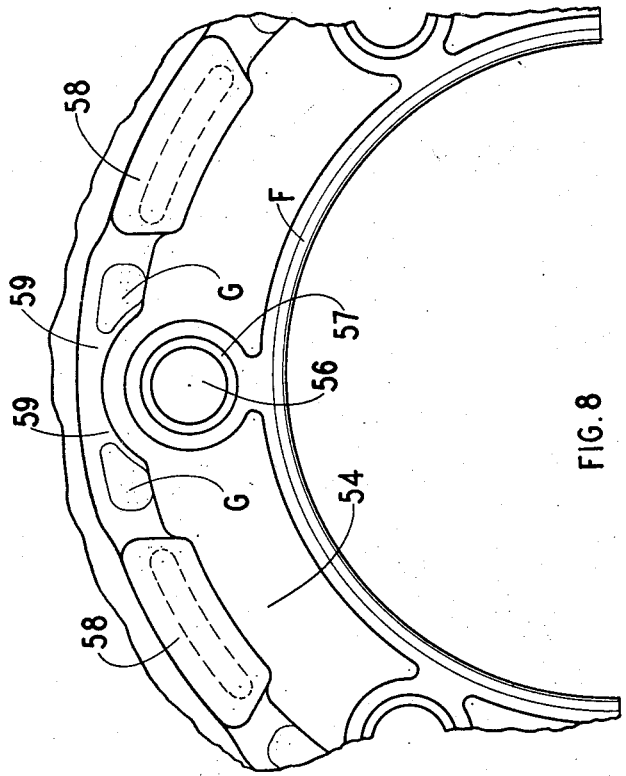
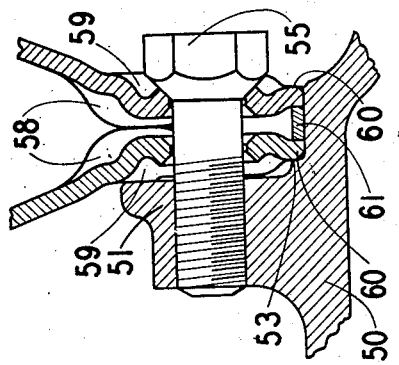
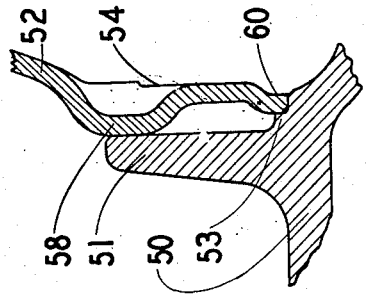
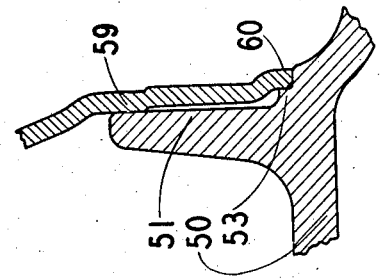
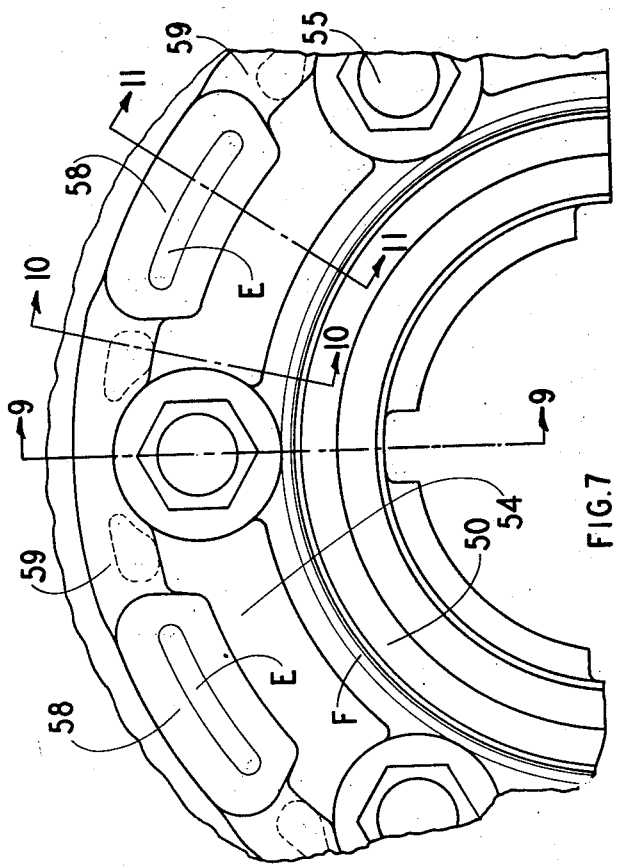
INVENTOR.
CHARLES R. STOUGH
BY
*Carroll R. Taber*
ATTORNEY Patented Apr. 20, 1943

2,317,311

UNITED STATES PATENT OFFICE 2,317,311

VEHICLE WHEEL

Charles R. Stough, Lansing, Mich., assignor to Motor Wheel Corporation, Lansing, Mich., a corporation of Michigan Application December 12, 1941, Serial No. 422,609

17 Claims. (Cl. 301—9)

This invention relates to pressed metal vehicle wheels, and more particularly to demountable wheels of the reversible type.

This application is a continuation in part of my copending application Serial No. 344,301, filed July 8, 1940, and is an improvement on the construction disclosed in my prior Reissue Patent No. 21,960, dated November 25, 1941.

In wheels designed for certain special applications, particularly those employed on industrial vehicles and farm machinery, it is desirable to be able to mount the wheels on their hubs with either side of the vehicle out, whereby to permit varying the tread of the vehicle. It is also desirable to be able to mount two wheels on each hub so as to able to increase the load carrying capacity of the vehicle, or to increase the traction thereof. In addition, it is necessary that such wheels be designed to produce a firm bearing between the wheel and the hub and at the same time provide for a proper connection between the clamping devices and the wheel flange to prevent the clamping devices from working loose in service. Preferably reversible wheels should be attachable to standard hubs so that they can be readily substituted for ordinary wheels.

The principal object of this invention is to provide a reversible wheel adapted for demountable attachment to a hub and designed to permit flexing of the wheel flange by the clamping means in each of its reversible positions.

Another object is to provide a wheel of this character in which the wheel flange contacts the hub flange in two radially spaced apart zones on opposite sides of the zone in which the clamping devices are situated.

Still another object of the invention is to provide a reversible wheel in which the wheel flange and hub flange contact each other in at least one circumferentially continuous annular zone, in either position in which the wheel is mounted.

Still another object of the invention is to provide a wheel body having a pressed metal wheel flange provided with radially spaced apart axially misaligned bearing surfaces on opposite faces thereof, wherein the radial distance between the bearing surfaces on each face of the wheel flange is substantially the same.

It is also an important object of the invention to provide integral projections on the opposite faces of a pressed metal wheel flange so formed and located that they will serve the dual function of reinforcing the wheel flange and spacing the wheel flange from the hub flange when the wheel flange is mounted in either of its reversible positions.

Briefly, the invention comprises a wheel, including a hub flange and a reversible wheel body having a one piece wheel flange provided in an annular zone concentric with the hub axis with circumferentially spaced apart openings for the reception of securing means, in which, in either of the positions of said wheel flanges, said zone is spaced from the hub flange by means located on radially opposite sides of said zone and integral with one or both of said flanges, the spacing means on one side of said zone being integral with the wheel flange. One of the spacing means for each face of the wheel flange is circumferentially continuous, and the radial distance between the spacing means for one face of the wheel flange is substantially the same as the radial distance between the spacing means for the other face of the wheel flange.

The foregoing objects and others ancillary thereto will more fully appear in the following specification when read in connection with the accompanying drawings, wherein—

Figure 1 is a fragmentary elevational view of a wheel embodying the invention;

Figure 2 is a fragmentary cross-sectional view taken on substantially the line 2—2 of Figure 1;

Figure 3 is a fragmentary elevational view of a portion of the wheel body taken on substantially the line 3—3 of Figure 5;

Figure 4 is a fragmentary cross-sectional view taken on substantially the line 4—4 of Figure 1;

Figure 5 is a fragmentary cross-sectional view taken on substantially the line 5—5 of Figure 1 and showing the wheel body mounted in a position the reverse of that shown in Figure 1;

Figure 6 is a fragmentary cross-sectional view showing a dual mounting of two wheels similar to the one shown in Figure 1;

Figure 7 is a fragmentary elevational view of a modified form of wheel;

Figure 8 is a fragmentary elevational view of the opposite face of the wheel shown in Figure 7;

Figure 9 is a fragmentary cross-sectional view taken on substantially the line 9—9 of Figure 7;

Figure 10 is a fragmentary cross-sectional view taken on substantially the line 10—10 of Figure 7;

Figure 11 is a fragmentary cross-sectional view taken on substantially the line 11—11 of Figure 7 but showing the wheel body mounted in a position the reverse of that shown in Figures 7, 9 and 10; and Figure 12 is a fragmentary cross-sectional view similar to Figure 9 but showing the mounting of dual wheels instead of a single wheel.

Figures 1 to 5 show one form of the invention as embodied in a wheel particularly adapted for use with farm machinery. The wheel comprises a hub 10 of conventional construction having a cylindrical portion 10a and a radial flange 11. The hub flange 11 is provided with a plurality of circumferentially spaced apart openings which are tapped to receive bolts or cap screws 12 having tapered portions 12a. Mounted on the hub 10 and held thereon by the cap screws 12 is a pressed metal wheel body 13. Attached to the periphery of the wheel body 13 by rivets 14 is a rim 15 adapted to mount a pneumatic tire.

The wheel body 13 is provided with a large central opening which is adapted to fit over the cylindrical portion 10a of the hub 10. The part of the wheel body immediately surrounding this opening, hereinafter called the wheel flange 16, is substantially coextensive with the hub flange 11. The wheel flange 16 is provided in an annular zone, hereinafter called the bolt circle zone, concentric with the hub axis, with circumferentially spaced apart openings 17 which correspond in number with the openings in the hub flange 11 and are axially aligned therewith. The openings 17 are adapted to receive the cap screws 12 and in order to accommodate the tapered portions 12a of the cap screws, the metal about each opening 17 is countersunk, as at 18. The countersunk portions are provided on both faces of the wheel flange whereby the heads of the cap screws will seat firmly in either position of the wheel body.

The wheel flange 16 is provided with a plurality of spacing means for spacing the bolt circle zone of the wheel flange 16 from the hub flange when either face of the wheel flange is juxtaposed to the hub flange 11. The two flanges are spaced apart in this manner in order to permit the wheel flange to be flexed in the region of each opening 17 when the cap screws are drawn up tightly. The spacing means includes radially spaced axial projections 19 and 22 located on one side of the wheel flange formed to provide contact areas A and B respectively between the two flanges when the wheel is mounted in the position shown in Figures 1 and 2; and axial projections 20 and 21 located on the other side of the wheel flange formed to provide contact areas C and D respectively between the two flanges when the wheel is mounted in the reverse position as shown in Figures 3 and 5.

Projection 19 is formed by turning inwardly the metal of the wheel flange about the hub receiving opening to provide a draw neck. The axially inner radial face of the draw neck is adapted to seat against the adjacent face of the hub flange 11 when the two flanges 11 and 16 are mounted in the position shown in Figure 2.

The projections 22 comprise a plurality of circumferentially spaced apart bosses formed in a narrow annular zone radially outward of the bolt circle zone. The projections 22 are formed by pressing the metal of the wheel flange axially in the same direction as the projection 19 and to the same extent.

Projection 20 is provided by rolling or pressing a rib in the wheel flange in a direction opposite to the projections 19 and 22. The projection 20 is formed in a zone immediately adjacent to and radially outwardly of the projection 19. The rib 20 is circumferentially continuous and extends axially outwardly beyond the bolt circle zone of the wheel flange.

Projections 21 comprise circumferentially spaced bosses formed in the same annular zone as the projections 22 and are located intermediate the latter. The projections 21 are formed by pressing the metal of the wheel flange 16 axially in the same direction as the rib 20 and to the same extent.

The wheel flange described above can be mounted either in the position shown in Figures 1, 2 and 4 or in Figure 5, that is, with either face of the wheel flange juxtaposed to the hub flange. In the position first mentioned the wheel flange contacts the hub flange only through the projections 19 and 22. The areas of contact are shown in Figure 1 in dotted lines and in Figure 3 in fill lines, and designated by the letters A and B respectively. When the wheel is mounted in the reverse position, that is, in the manner shown in cross-section in Figure 5, the wheel flange contacts the hub flange through the projections 20 and 21 in the circumferentially elongated and radially narrow areas C and D, shown in dotted lines in Figure 3 and shown in full lines in Figure 1.

It will be noted that in each instance the wheel flange and hub flange touch each other only in spaced apart zones on radially opposite sides of the bolt circle zone. It will also be noted that the areas of contact are spaced a substantial distance from these openings 17. Thus, when the cap screws are threaded home tightly the metal surrounding each opening 17 is spaced away from the hub flange and is flexed by the securing means 12. This flexing creates a tension in the metal of the wheel flange and minimizes the possibility of accidental loosening of the securing means.

The radial distance between the adjacent edges of the contact areas A and B one one face of the wheel flange is practically the same as the radial distance between the adjacent edges of areas C and D on the other face of the wheel flange. Therefore, no matter which way the wheel flange is mounted, tension is set up in the wheel flange when the cap screws are threaded home. Furthermore, both projections 19 and 20 are continuous and extend out from the corresponding face of the wheel flange. They stiffen the wheel circumferentially where it is weakened by the hub receiving opening and minimize the possibility of the wheel flange collapsing axially in the flexing zones around the openings when the cap screws are threaded home.

Figure 6 shows the mounting of two wheel bodies identical with the wheel body 13 previously described. When dual wheels are used, as shown in Figure 6, the axially inner wheel flange, or the flange adjacent the hub flange, is mounted in the same direction as is the wheel shown in Figures 1 and 2, while the outer wheel flange is mounted in the direction of the wheel flange disclosed in Figure 5. The areas of contact between the hub flange and inner wheel flange are areas A and B. The two wheels bear against each other in the areas of contact designated by the letters C and D. Flexing of the outer wheel flange in the flexing zones surrounding the bolt holes 17 is exactly the same as that previously described. Flexing of the inner wheel flange occurs between the projections 22 contacting the hub flange and the projections 21, against which the pressure of the cap screws is applied through means of the outer flange.

Figures 7 to 11 disclose a somewhat modified form of the invention. The wheel shown in these figures comprises a hub 50 having a radial hub flange 51 to which a wheel body 52 is secured by clamping means 55. The wheel body 52 has a one piece wheel flange 54 provided with a plurality of circumferentially spaced apart openings 56 for the reception of securing means 55. The metal about the openings 56 is countersunk from each face of the wheel flange to provide identical seats 57 for the heads of the securing means 55.

The wheel shown in Figures 7 to 11 is also provided with means for spacing the bolt circle zone of the wheel flange 54 from the hub flange in either position in which the wheel flange is mounted. In this modification the spacing means includes a rib 53 integral with the hub flange, and contacting the wheel in the area F, and bosses 58 and 59 on the wheel flange have contact areas E and G, respectively. (See Figures 7 and 8.) Bosses 58 extend axially outwardly from one face of the wheel flange, and bosses 59 extend axially outwardly from the other face of the wheel flange. (See Figures 10 and 11.) Bosses 58 and 59 are formed so that their contact areas E and G are arranged in spaced apart circumferential relation and in an annular zone radially outwardly of the annular zone in which the openings 56 are formed.

The inner periphery of the wheel flange is formed to provide a narrow radial flange 60 which is located midway, in an axial direction, between the axially outer surfaces of the bosses 58 and 59. This flange 60 is adapted to contact the axially outer surface of the rib 53 on the hub in either position that the wheel flange is mounted.

From the foregoing it will be seen that when the wheel body is mounted in the position shown in Figure 9 the wheel flange 54 touches the hub flange in the zones indicated by the letters E and F. (See Figure 7.) When the wheel is mounted in the reversed position, as shown in Figure 11, the wheel flange contacts the hub flange in the zones indicated by the letters G and F. (See Figure 8.) In either instance the two flanges touch each other only in radially widely spaced annular zones located on radially opposite sides of the bolt circle zone. The bolt circle zone is thereby spaced from the hub flange 51. Consequently, when the securing means 55 are threaded home tightly the wheel flange is flexed in a flexing zone surrounding each opening 56 so as to prevent loosening of the securing means.

As in the case of the wheel shown in Figures 1 to 5, the radial distance between the spacing means for each face of the wheel flange is the same. Furthermore, the continuous contact between the rib 53 and the narrow flange 60 at the inner periphery of the wheel flange 54 provides a firm bearing area of large extent which eliminates the possibility of collapsing the flexing zones about the openings 56 against the hub flange.

The wheel shown in Figures 7 to 11 can be dualled in the manner shown in Figure 12. In order to mount these wheels dually a spacer ring 61 is required. The ring 61 is inserted between the adjacent flange 60 of the two wheel bodies when mounted in the manner shown in Figure 11. The spacer 61 will be twice the axial thickness of the rib 53.

From the foregoing it will be seen that this invention provides a wheel structure which can be mounted in either of two reversed positions to permit varying of the tread of the vehicle with which it is used. The invention provides a firm bearing of relatively great area between the wheel flange and the hub flange in either position in which the wheel is mounted. Also, it provides for sufficient flexing of the wheel flange when the latter is clamped to the hub flange to prevent the loosening of the securing means which holds the two parts of the wheel together. It will also be apparent that all of the projections on the wheel flange which form the bearing surfaces are so formed and located that they serve the additional function of reinforcing the wheel flange in both of its reversible positions.

The scope of the invention is indicated in the appended claims.

I claim:

1. A reversible wheel including, in combination, a radial hub flange provided with a plurality of openings circumferentially spaced apart about the hub axis in an annular zone concentric with said axis, a one piece pressed metal wheel flange provided with a plurality of openings axially aligned with the corresponding openings in the hub flange, and securing means in said openings for detachably clamping the wheel flange to the hub flange, means integral with one of said flanges and located radially inwardly of said zone and means integral with one of said flanges and located radially outwardly of said zone for spacing the wheel flange from the hub flange in said zone when either face of the wheel flange is clamped to the hub flange by said securing means, certain of said spacing means being integral with the wheel flange and the radial distance between the spacing means for one face of the wheel flange being substantially equal to the radial distance between the spacing means for the other face of the wheel flange.

2. A reversible wheel of the character defined in claim 1 wherein one of said spacing means is integral with the hub flange.

3. A reversible wheel of the character defined in claim 1 wherein all of said spacing means are integral with the wheel flange.

4. A reversible wheel of the character defined in claim 1 wherein one of said spacing means is circumferentially continuous.

5. A reversible wheel of the character defined in claim 1 wherein the spacing means at one side of said zone lie in a common circle concentric with said zone.

6. A reversible wheel of the character defined in claim 1 wherein the spacing means at one side of said zone comprises a plurality of spaced apart projections extending axially outwardly from one face of the wheel flange, and other projections intermediate the first mentioned projections extending axially outwardly from the opposite face of the wheel flange.

7. A reversible wheel of the character defined in claim 1 wherein the spacing means at one side of said zone comprises an annular rib extending axially from the face of the hub flange adjacent the wheel flange 8. A reversible wheel of the character defined in claim 1 wherein certain of said means are formed to provide circumferentially continuous contact between the flanges when either face of the wheel flange is clamped to the hub flange.

9. A reversible wheel including, in combination, a radial hub flange provided with a plurality of openings circumferentially spaced apart about the hub axis in an annular zone concentric with said axis, a one piece pressed metal wheel flange provided with a plurality of openings axially aligned with the corresponding openings in the hub flange, and securing means in said openings for detachably clamping the wheel flange to the hub flange, means integral with one of said flanges and located radially inwardly of said zone and means integral with one of said flanges and located radially outwardly of said zone for spacing the wheel flange from the hub flange in said zone when either face of the wheel flange is clamped to the hub flange by said securing means, certain of said spacing means being integral with the wheel flange and one of the means for spacing each face of the wheel flange from the hub flange being circumferentially continuous.

10. A reversible wheel of the character defined in claim 9 wherein one of said spacing means is integral with the hub flange.

11. A reversible wheel of the character defined in claim 9 wherein all of said spacing means are integral with the wheel flange.

12. A reversible wheel of the character defined in claim 9 wherein the spacing means at one side of said zone lie in a common circle concentric with said zone.

13. A reversible wheel of the character defined in claim 9 wherein the spacing means at one side of said zone comprises a plurality of spaced apart projections extending axially outwardly from one face of the wheel flange, and other projections intermediate the first mentioned projections extending axially outwardly from the opposite face of the wheel flange.

14. A reversible wheel of the character defined in claim 9 wherein the spacing means at one side of said zone comprises an annular rib extending axially from the face of the hub flange adjacent the wheel flange.

15. A reversible wheel including, in combination, a hub flange provided with a plurality of circumferentially spaced apart openings, a one piece pressed metal wheel flange provided with a plurality of corresponding circumferentially spaced apart openings, securing means adapted to be received in said openings for detachably clamping the wheel flange to the hub flange, a plurality of means for spacing said flanges apart in the region of the openings therein when either side of the wheel flange is clamped to the hub flange by said securing means whereby to flex the wheel flange in the region of the openings therein, certain of said spacing means being formed to provide a circumferentially continuous bearing between the flanges radially inwardly of the securing means when either side of the wheel flange is clamped to the hub flange, at least one of the spacing means being formed as an integral part of the wheel flange.

16. A reversible wheel comprising a radial hub flange and a one piece pressed metal wheel body flange in juxtaposed relationship to said hub flange, said flanges having a plurality of corresponding axially extending openings therethrough, the centers of said openings being circumferentially spaced on a circle concentric with the axis of the wheel, the openings in the wheel body flange being formed in coplanar zones thereof, and securing means in said openings for detachably clamping said flanges together, said wheel body flange having a pair of spaced apart bearing surfaces located on radially opposite sides of said circle and offset axially in one direction from said coplanar zones, and another pair of spaced apart bearing surfaces on radially opposite sides of said circle and offset axially in the opposite direction from said coplanar zones, at least one bearing surface extending in each axial direction from said coplanar zones being circumferentially continuous.

17. The combination set forth in claim 16 wherein the bearing surfaces of each pair are spaced apart substantially equal distances.

CHARLES R. STOUGH.